United States Patent
Wiese

(10) Patent No.: US 8,230,484 B1
(45) Date of Patent: Jul. 24, 2012

(54) CONTROL OF RESOURCE ACCESS PRIVILEGES VIA AGENT AUTHENTICATION

(75) Inventor: James Christopher Wiese, Dublin, CA (US)

(73) Assignee: EMC Corporation, Hopkinton, MA (US)

( * ) Notice: Subject to any disclaimer, the term of this patent is extended or adjusted under 35 U.S.C. 154(b) by 887 days.

(21) Appl. No.: 12/113,878

(22) Filed: May 1, 2008

Related U.S. Application Data

(60) Provisional application No. 60/915,122, filed on May 1, 2007.

(51) Int. Cl.
*G06F 7/04* (2006.01)
*G06F 15/16* (2006.01)
*G06F 17/30* (2006.01)
*H04L 29/06* (2006.01)

(52) U.S. Cl. ......... 726/3; 726/4; 726/5; 726/6; 726/27; 726/28; 726/29; 726/30

(58) Field of Classification Search ............... 726/3–6, 726/27–30
See application file for complete search history.

(56) References Cited

U.S. PATENT DOCUMENTS

| | | | | |
|---|---|---|---|---|
| 6,055,637 A * | 4/2000 | Hudson et al. | ................ | 726/20 |
| 7,249,374 B1 * | 7/2007 | Lear et al. | ................ | 726/6 |
| 7,424,475 B2 * | 9/2008 | Ishii et al. | ................ | 1/1 |
| 7,539,862 B2 * | 5/2009 | Edgett et al. | ................ | 713/168 |
| 7,568,230 B2 * | 7/2009 | Lieberman et al. | ................ | 726/23 |
| 7,849,507 B1 * | 12/2010 | Bloch et al. | ................ | 726/22 |
| 7,882,538 B1 * | 2/2011 | Palmer | ................ | 726/1 |
| 2005/0021952 A1 * | 1/2005 | Haugh | ................ | 713/166 |
| 2006/0156384 A1 * | 7/2006 | Minium et al. | ................ | 726/2 |
| 2007/0220252 A1 * | 9/2007 | Sinko | ................ | 713/168 |
| 2008/0104196 A1 * | 5/2008 | Yalakanti et al. | ................ | 709/217 |
| 2008/0120695 A1 * | 5/2008 | Tirosh et al. | ................ | 726/3 |
| 2009/0222907 A1 * | 9/2009 | Guichard | ................ | 726/17 |

* cited by examiner

*Primary Examiner* — Brandon Hoffman
*Assistant Examiner* — Jayesh Jhaveri
(74) *Attorney, Agent, or Firm* — PatentVentures; Bennett Smith; Korbin Van Dyke

(57) ABSTRACT

A client computer and/or a user is authenticated via installation of an agent, permitting access to previously inaccessible resources. All users are initially denied access to a resource via a permission list, such as a by being a member of a group that is denied access. The user, once authenticated, is permitted to access the resource, e.g. by being temporarily removed from a cached copy of the group, by being temporarily added to a cached copy of a group allowed to access the resource, or both. Authentication is revoked when the agent is uninstalled. Subsequent accesses to the resource are not permitted, e.g. by undoing the temporary removal or addition. An optional resource firewall proxy server between client computers and a resource filters requests for the resource, and until a user is authenticated via an out-of-band communication from an agent, the user is denied access to the resource.

20 Claims, 7 Drawing Sheets

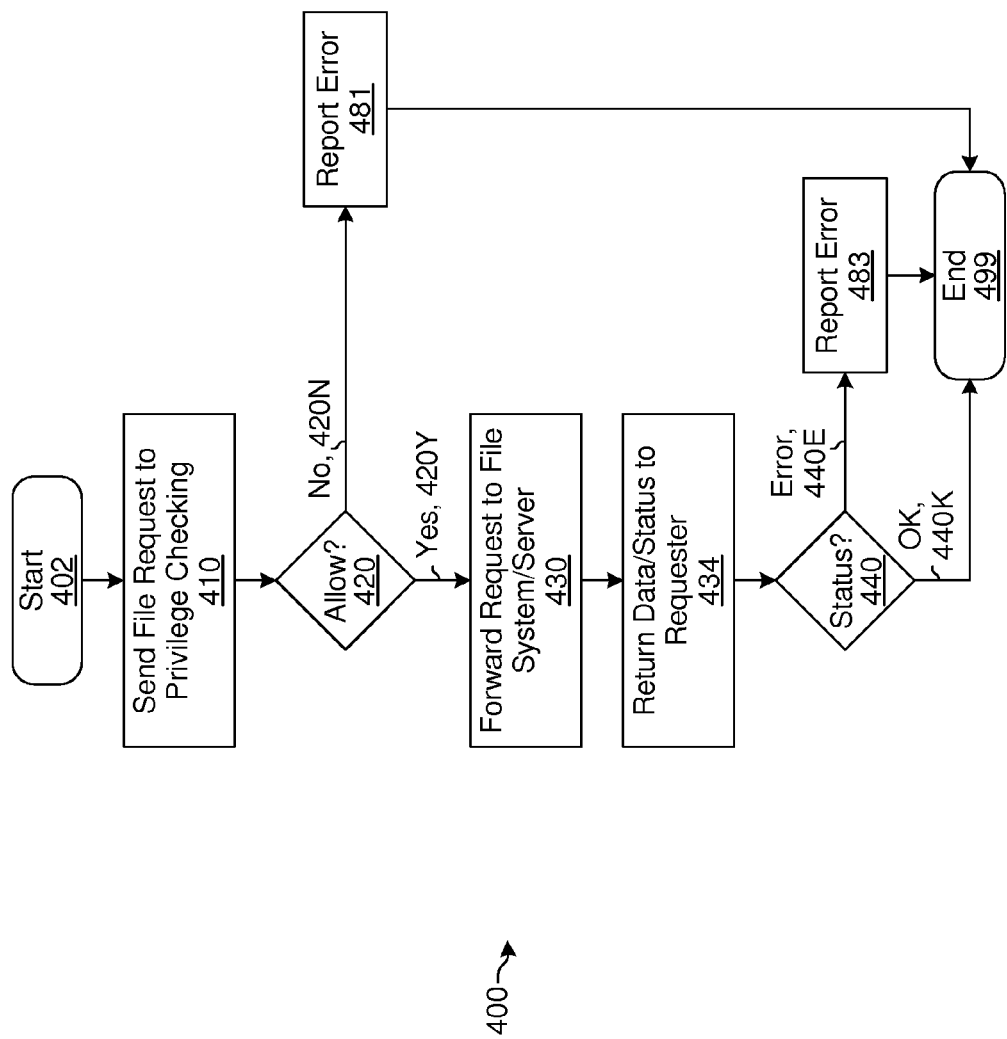

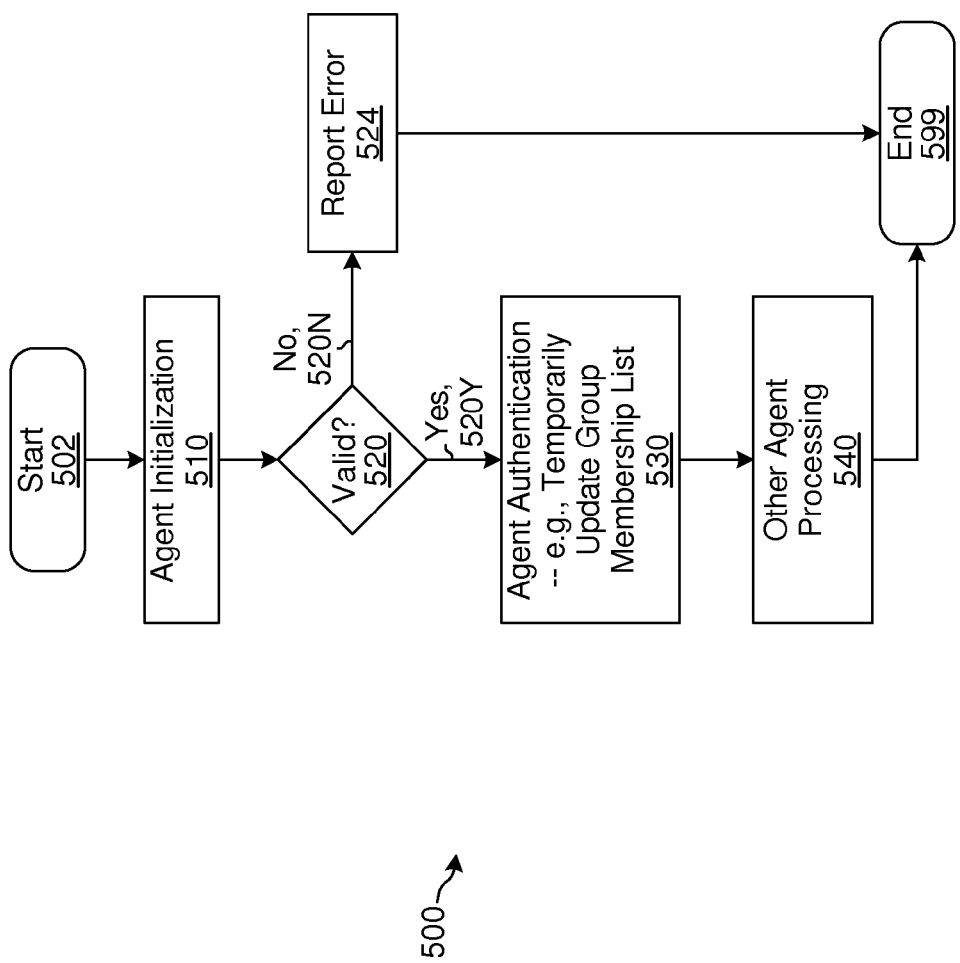

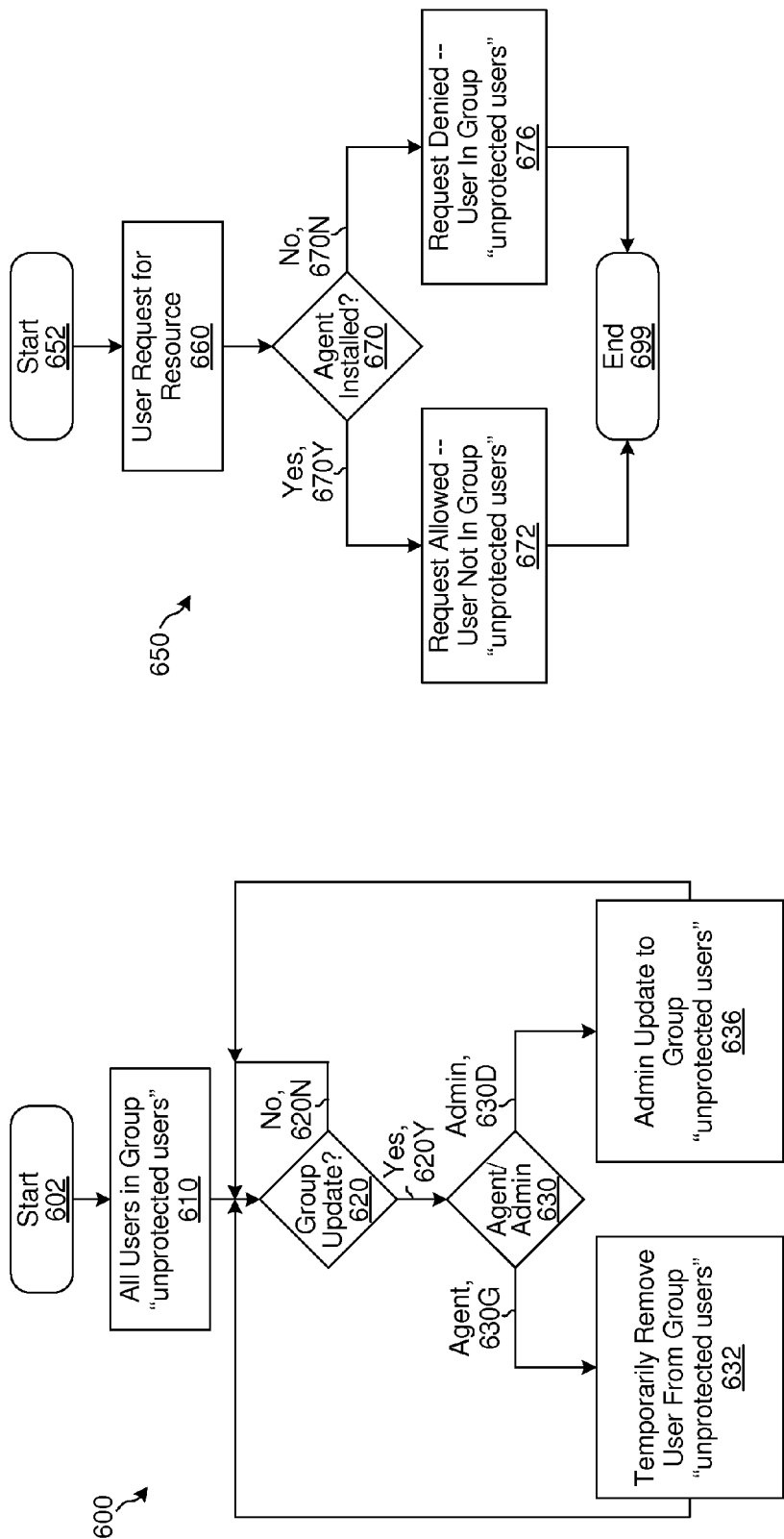

CONTROL OF RESOURCE ACCESS PRIVILEGES VIA AGENT AUTHENTICATION

CROSS REFERENCE TO RELATED APPLICATIONS

Priority benefit claims for this application are made in the accompanying Application Data Sheet, Request, or Transmittal (as appropriate, if any). To the extent permitted by the type of the instant application, this application incorporates by reference for all purposes the following applications, all owned by the owner of the instant application:

U.S. Provisional Application Ser. No. 60/915,122, filed May 1, 2007, first named inventor James Christopher Wiese, and entitled Control of Resource Access Privileges via Agent Authentication.

BACKGROUND

1. Field

Advancements in authentication of access to resources are needed to provide improvements in performance, efficiency, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

SYNOPSIS

The invention may be implemented in numerous ways, including as a process, an article of manufacture, an apparatus, a system, a composition of matter, and a computer readable medium such as a computer readable storage medium (e.g. media in an optical and/or magnetic mass storage device such as a disk, or an integrated circuit having non-volatile storage such as flash storage) or a computer network wherein program instructions are sent over optical or electronic communication links. In this specification, these implementations, or any other form that the invention may take, may be referred to as techniques. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Example Embodiments of one or more of systems, methods, articles of manufacture, and computer readable media in accordance with the concepts described herein. As is discussed in more detail in the Conclusions, the invention encompasses all possible modifications and variations within the scope of the issued claims.

BRIEF DESCRIPTION OF DRAWINGS

FIG. 4 illustrates selected details of an embodiment of accessing a resource, including privilege checking of the accessing.

FIG. 5 illustrates selected details of an embodiment of a process for an agent to authenticate accesses to resources by temporarily updating a group membership list.

FIG. 6A illustrates selected details of an embodiment of a process for managing a group membership list.

FIG. 6B illustrates selected details of an embodiment of a process for agent-based authentication of access to a resource.

DETAILED DESCRIPTION

Figure 1:
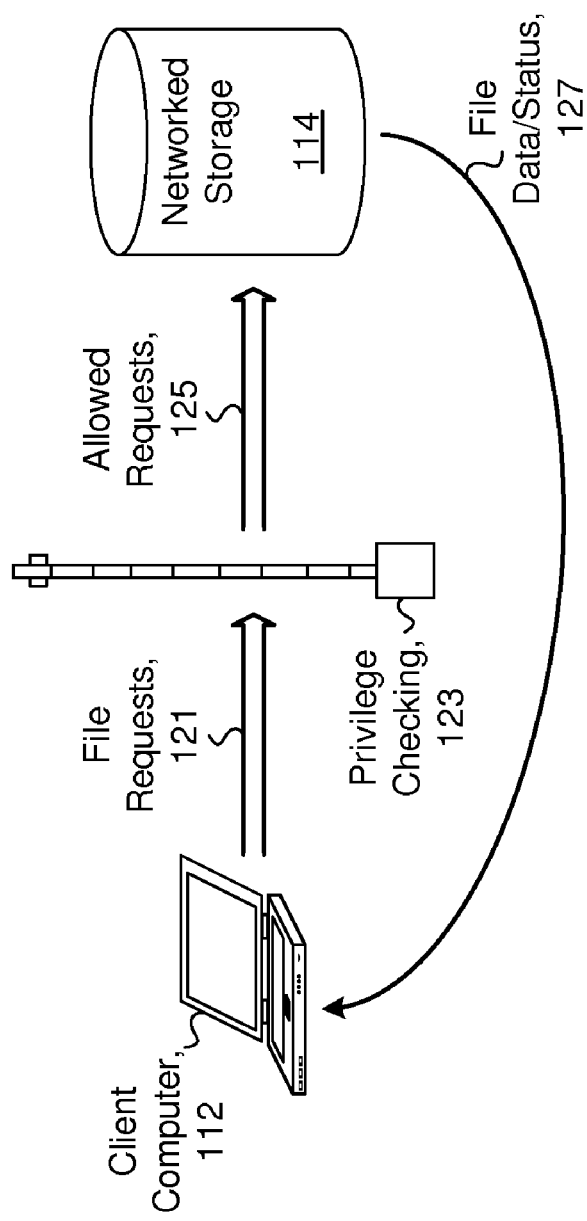
FIG. 1 illustrates selected details of an embodiment of a mechanism for controlling resource access privileges via agent authentication.

A detailed description of one or more embodiments of the invention is provided below along with accompanying figures illustrating selected details of the invention. The invention is described in connection with the embodiments. It is well established that it is neither necessary, practical, or possible to exhaustively describe every embodiment of the invention. Thus the embodiments herein are understood to be merely exemplary, the invention is expressly not limited to or by any or all of the embodiments herein, and the invention encompasses numerous alternatives, modifications and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

INTRODUCTION

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

ACRONYMS

Elsewhere herein various shorthand abbreviations, or acronyms, are used to refer to certain elements. The descriptions of at least some of the acronyms follow.

| Acronym | Description |
| --- | --- |
| ID | IDentity/IDentification |
| NAS | Network Attached Storage |
| OS | Operating System |
| SAN | Storage Area Network |

Control of resource access privileges via agent authentication provides, in various usage scenarios, for efficient protection, regulation, and management of resources, such as reading from and/or writing to files of the resources. In response to installing an agent, a client computer and/or a user is authenticated, permitting the client computer and/or the user to access resources that were otherwise inaccessible before the authentication. All users are initially denied access to a resource in a permission list, such as a by being a member of a group that is denied access. When a user is authenticated (such as when logging in), the user is permitted to access the resource, such as by being temporarily removed from the group, by being temporarily added to a group allowed to access the resource, or both. The temporary removal (or addition) is via removing (or adding) an entry from (or to) a cached copy of a group membership list. In response to uninstalling the agent, authentication is revoked, and subsequent accesses to the resource are not permitted, such as by undoing the temporary removal (or addition). The undoing is via ceasing to use the cached copy, discarding the cached copy, or modifying the cached copy to undo the effect of the temporary removal (or addition). An optional resource firewall proxy server between one or more client computers and a resource filters requests for the resource. Until a user is authenticated via an out-of-band communication from an agent, the user is denied access to the resource.

The Introduction section concludes with Example Embodiments in accordance with the aforementioned concepts. The Introduction section is then followed by a System section that provides a relatively detailed overview description of agent-based authentication for access control, a resource firewall proxy server, group membership lists, and concepts relating to an agent. A following Operation section provides additional details of embodiments for controlling resource access privileges via agent authentication, resource access and authentication, and agent-based authentication via group membership lists. A following Example Implementation Techniques section describes various schemes to implement embodiments described in the Systems and Operation sections.

Example Embodiments

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims.

EC1) A method for authenticating access to resources, the method including:
  denying, by default, access to a resource by a community of users, via a permission list; installing an agent on a client computer;
  authenticating, in response to the installing, access to the resource by a particular user of the community of users; and
  wherein the authenticating is, at least in part, by temporarily updating the permission list.

EC2) The method of EC1:
  wherein the permission list by default denies the access to a particular group; and
  wherein the updating temporarily removes the particular user from the particular group.

EC3) The method of EC1:
  wherein the permission list by default is empty; and
  wherein the updating temporarily adds the particular user to the permission list and grants the particular user the access.

EC4) The method of EC1:
  wherein the permission list includes a group membership list.

EC5) The method of EC1:
  wherein the access is one or more of read access and write access.

EC6) The method of EC1:
  wherein the particular user is determined as one who installs the agent on the client computer.

EC7) The method of EC1:
  wherein the particular user is determined as one who is logged into the client computer when the agent is installed.

EC8) A system including:
  a client computer enabled to execute a resource-accessing program, the resource-accessing program enabled to make a request for access to a resource, the request including an identifier;
  a privilege checking unit enabled to receive the request, and further enabled to selectively forward the request to the resource;
  an agent program on the client computer, the agent program enabled to authenticate the access via temporary updating of a permission list; and
  wherein the privilege checking unit is enabled to determine that the request has permission for the access based, at least in part, on the permission list and the identifier.

EC9) A method for authenticating access to resources, the method including:
  making a request for access to a resource from a resource-accessing program executing on a client computer, the request including an identifier;
  selectively forwarding the request to the resource via a privilege checking unit;
  authenticating the access via an agent program on the client computer, the agent program authenticating the access via temporary updating of a permission list;
  wherein the privilege checking unit determines that the client computer has permission for the access based, at least in part, on the permission list and the identifier.

EC10) The system of EC8 or method of EC9:
wherein the identifier specifies, at least in part, a user of the client computer, the user being enabled to activate the resource-accessing program.

EC11) The system of EC8 or method of EC9:
wherein the identifier specifies, at least in part, the client computer.

EC12) The system/method of EC11:
wherein the identifier includes a network address of the client computer.

EC13) The system of EC8 or method of EC9:
wherein the privilege checking unit is a storage firewall proxy server.

EC14) The system of EC8 or method of EC9:
wherein the resource is included in storage of the privilege checking unit.

EC15) The system of EC8 or method of EC9:
wherein the privilege checking unit is a portion of an operating system performing access permission validation and/or privilege checking.

EC16) The system/method of EC15:
wherein the access permission validation and/or privilege checking uses group membership lists.

EC17) The system of EC8 or method of EC9:
wherein the resource is a file server.

EC18) The system of EC8 or method of EC9:
wherein the resource is a file system.

EC19) The system of EC8 or method of EC9:
wherein the request is a file read or a file write.

EC20) The system of EC8 or method of EC9:
wherein the permission list includes a group membership list.

EC21) The system of EC8 or method of EC9:
wherein the agent program is enabled to authenticate the access by temporarily changing membership in a group membership list.

EC22) The system of EC8 or method of EC9:
wherein the agent program is enabled to authenticate the access by temporarily removing membership from a group membership list.

EC23) The system/method of EC22:
wherein the group membership list has a deny attribute for the access.

EC24) The system of EC8 or method of EC9:
wherein the agent program is enabled to authenticate the access by out-of-band communication with the privilege checking unit.

EC25) The system of EC8 or method of EC9:
wherein the agent program is enabled to authenticate the access when the agent program is installed on the client computer.

EC26) The system of EC8 or method of EC9:
wherein the agent program is enabled to authenticate the access when the agent program is executed on the client computer.

EC27) The system of EC8 or method of EC9:
wherein the agent program is enabled to authenticate the access when the agent program is executing on the client computer.

EC28) The system of EC8 or method of EC9:
wherein the selective forwarding is enabled to forward requests that are allowed by the privilege checking unit.

EC29) The system/method of EC28:
wherein the allowance is, at least in part, based on a group membership list.

EC30) The system of EC8 or method of EC9:
wherein the selective forwarding is enabled to return an error for requests that are not allowed by the privilege checking unit.

EC31) A method for authenticating access to resources, the method including:
an agent program on a client computer temporarily updating a permission list to authenticate subsequent access to a resource;
making a request for access to a resource from a resource-accessing program executing on the client computer, the request including an identifier;
selectively forwarding the request to the resource via a privilege checking unit; and
the privilege checking unit determining that the client computer has permission for accessing the resource based, at least in part, on the permission list and the identifier.

EC32) The method of EC31, wherein:
the updating includes the agent program temporarily changing a membership in a group membership list prior to the determining.

EC33) The method of EC32, wherein:
the changing includes the agent program temporarily deleting a membership in an access-denied group membership list prior to the determining; and
whereby client computers executing the agent program are temporarily removed from the access-denied group membership list.

EC34) The method of EC32, wherein:
the changing includes the agent program temporarily adding a membership in an access-granted group membership list prior to the determining; and
whereby client computers executing the agent program are temporarily added to the access-granted group membership list.

EC35) The method of EC31, wherein:
the updating of the permission list includes the agent program communicating out-of-band with the privilege checking unit prior to the determining.

EC36) A method including:
adding an entry to a group, the entry corresponding to an entity;
subsequently to the adding, and in response to installing an agent program on a client computer, temporarily removing the entry from the group; and
denying a request from the entity to access a resource if the entry is in the group when the request occurs.

EC37) A method including:
adding an entry to a group, the entry corresponding to an entity;
subsequently to the adding, and in response to installing an agent program on a client computer, temporarily removing the entry from the group; and
denying a request from the entity to access a resource if the request occurs before the adding.

EC38) A method including:
adding an entry to a group, the entry corresponding to an entity;
subsequently to the adding, and in response to installing an agent program on a client computer, temporarily removing the entry from the group;
in response to a request to access a resource, determining a source of the request; and
denying the request if the group has an entry that corresponds to the source of the request.

EC39) The method of any of EC36, EC37, or EC38:
wherein the entity is a client computer.

EC40) The method of any of EC36, EC37, or EC38:
wherein the entity is a user logged into a client computer.

EC41) The method of any of EC36, EC37, or EC38:
wherein the entity is a user who has installed the agent program.

System

Agent-Based Authentication for Access Control

In some embodiments, access control systems, such as those found in network file servers, identify an accessing entity by a user identifier (user ID) and/or by membership in one or more named groups. The user ID is optionally dependent on an OS executing on (or on behalf of) the accessing entity, and thus a user ID provided by an OS that is trusted is distinguishable from a user ID provided by an OS that is not trusted. According to various embodiments, access is explicitly granted and/or denied for resources, such as files, by enumerated "access rights" for users and/or for groups.

In some embodiments, when a user (having a specific user ID, and being a member of one or more named groups) accesses a resource, such as a file, access is granted if the user ID is permitted access to the resource, or if a group to which the user belongs is permitted access to the resource. In various embodiments, access to a resource is controlled by a permission list for the resource, each of zero or more elements of the permission list including a user ID and/or a group name along with access rights for the user ID and/or group. According to various embodiments, the access rights allow or deny various types of access, such as read access, write access, delete access, or all access. In various embodiments, rules control how conflicting access rights are resolved. For example, a user has an access right allowing read access to a resource, and the user is a member of a group that is denied all access to the resource. In some embodiments, user access rights takes precedence over group access rights. In some embodiments, any denial of access rights takes precedence over any allowance of access rights.

In some embodiments, an authentication mechanism enforces additional requirements before access from a client computer (and/or from a user) to a resource is granted. For example, in some embodiments, a requirement is enforced that an agent (e.g. a software program) be installed on the client computer before access to sensitive files is allowed. In various embodiments, requiring installation of an agent enables enforcement of usage restrictions, such as by disabling access to some or all resources from the client computer and/or from a specific user until the agent is installed.

Resource Firewall Proxy Server

Figure 2:
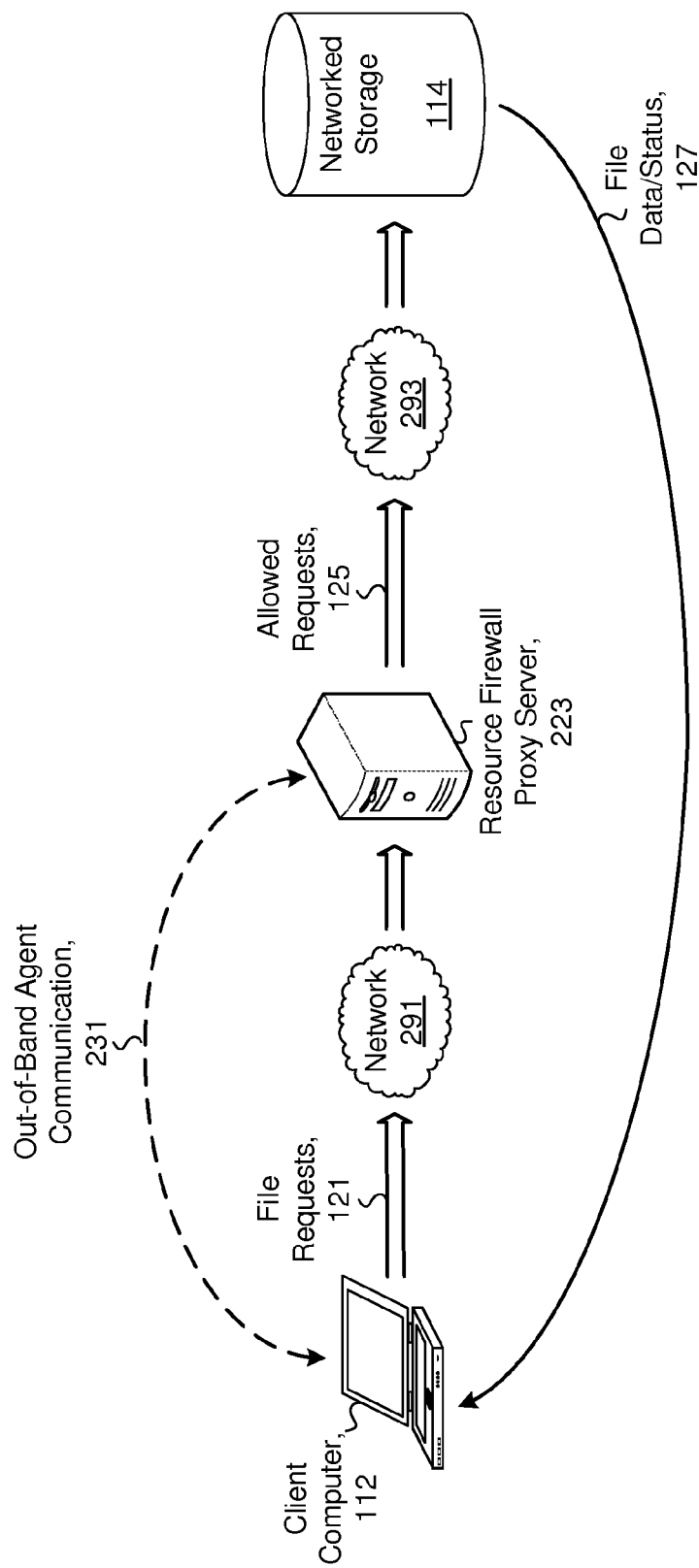
FIG. 2 illustrates selected details of an embodiment of the mechanism for controlling resource access privileges via agent authentication by authenticating access to resources using a resource firewall proxy server and out-of-band agent communication.

In some embodiments, a resource firewall proxy server (such as Resource Firewall Proxy Server 223 of FIG. 2) is installed between a client computer (such as Client Computer 112 of FIG. 2) and a resource (such as Networked Storage 114 of FIG. 2). All requests to access the resource (or at a minimum, all requests that agent-based authentication is required for) go through the resource firewall proxy server, rather than directly to the resource. For example, in some usage scenarios, client computers do not have a name and/or an address of the resource, and instead have a name and/or an address of the resource firewall proxy server. In some embodiments, the resource firewall proxy server is installed in between a network segment that contains the resource and one or more requesters, and all requests to access the resource go through the resource firewall proxy server. The resource firewall proxy server allows the requests solely if a source of the request (a client computer and/or a user of the client computer) has been authenticated. Allowed requests are forwarded to the resource. In various embodiments, denied requests result in a reported error.

In some embodiments, when an agent is installed on a client computer, an out-of-band communication (such as Out-of-Band Agent Communication 231 of FIG. 2) with the resource firewall proxy server authenticates the client computer and/or a user. In various embodiments, the out-of-band communication is performed by an installation program and/or by the agent. In some embodiments, when an agent installed on a client computer is executed, the agent performs an out-of-band communication with the resource firewall proxy server to authenticate the client computer and/or a user. In other embodiments, after an agent is installed on a client computer, when a first request is made to the resource, the agent authenticates the client computer and/or a user via an out-of-band communication with the resource firewall proxy server.

In various embodiments, once the client computer and/or the user has been authenticated, the resource firewall proxy server forward requests from the client computer and/or the user to the resource, and the requests are allowed or denied based on access rights as implemented on the resource. However, if the client computer and/or the user have not been authenticated (such as due to the agent being uninstalled, not executing, or inoperable), then the resource firewall proxy server does not forward the request.

In some embodiments, the resource firewall proxy server is a computer acting as a gateway. In other embodiments, the resource firewall proxy server is embodied in networking hardware, such as a router, a switch, or a hardware firewall.

Group Membership Lists

According to various embodiments, installing and/or executing an agent (such as Agent 353 of FIG. 3) on a client computer (such as Client Computer 112 of FIG. 3) temporarily updates one or more permission lists (such as Group Membership Lists 373 of FIG. 3), to authenticate access to one or more resources. According to various embodiments, the permission lists are temporarily updated for one or more of the client computer, a user of the client computer, a logged-in user of the client computer, and a user installing the agent. In various embodiments, the temporary update of one of the permission lists temporarily adds and/or temporarily deletes group membership. For example, an administrator sets up group access rights that deny all access to files prior to an agent installation. In response to, and/or as part of installing the agent on a client computer, the group access rights are temporarily updated, and access to the files from a user of the client computer is allowed. In response to (and/or as part of) uninstalling the agent from the client computer, the group access rights are updated (such as via undoing the temporary update), and access to the files from the user of the client computer is disallowed. Hence, the access rights of the user to the files are contingent on the agent being installed. In some embodiments, the temporary update is via modification of a temporary and/or cached copy of a permanent permission list, and the undoing is via ceasing to use the copy, discarding the copy, and/or reversing any effects of the modification.

In an example where group membership is temporarily added in response to installing the agent, a file resource "sensitive_file.doc" is permitted access only for a group "protected content". User "joe" is initially a member of a group "everyone", and of a group "engineering". When user "joe" accesses the file "sensitive_file.doc" before having been authenticated (e.g., before having installed the agent), user "joe" is denied access, as user "joe" is not a member of group "protected content". However, in response to user "joe" installing the agent on a client computer of user "joe", the agent temporarily adds user "joe" to the group "protected content". After the agent is installed and initialized, user "joe"

is a member of the groups "everyone", "engineering", and "protected content". Hence, after the agent is installed, when user "joe" attempts to access the file resource "sensitive_file. doc", user "joe" is allowed access. In some usage scenarios and/or embodiments, the installing is in response to a user logging into the client computer, and the uninstalling is in response to the user logging out of the client computer. In a context of the example, when user "joe" begins a session by logging into a client computer, the agent is installed. When user "joe" ends the session by logging out of the client computer, the agent is uninstalled. Thus for the session only (corresponding to when the agent has been installed and not yet uninstalled, e.g. the agent is active), user "joe" is granted privilege and/or permission to resources that would otherwise be inaccessible.

In some embodiments, a community of users is denied access to one or more network resources, such as all network files on a server and/or a particular network file system, except for individual ones of the users that have installed an agent, such as a security agent. In various embodiments, a deny access function of a permission list overrides an allow access function, enabling membership in a group that is denied access to control whether access is allowed or denied.

In some embodiments, a particular group contains all users of a community of users, and a particular resource is denied access from (members of) the particular group in a permission list. In various embodiments, the particular group is defined to include all users of another group, such as a group "everyone". In further embodiments, the particular group is defined to include all users of another group, except for a particular list of one or more users. In various embodiments, when a particular user of the community of users is authenticated by an agent, such as, for example, when the agent is installed on a client computer (e.g. by the particular user), the particular user is temporarily removed from the particular group. Accordingly, installing the agent enables the particular user to access the particular resource. When the agent is uninstalled from the client computer, the particular user is added (back; e.g. restored) to the particular group. Accordingly, uninstalling the agent disables the particular user from accessing the particular resource.

For example, consider a system where access to file system resources are managed at least in part via permission lists, and that the lists reference one or more groups. A group of "unprotected users" is defined, initially having as all members all users of the system. Each of the permission lists includes a reference to the "unprotected users" group (having 'deny' access to specific files and/or directories of the file system resources), and thus without further actions, all of the users are denied access to the specific files and/or directories. When a particular one of the users installs an agent (such as part of or in response to logging in), in response to (or alternatively as part of) the installation, the particular user is temporarily removed from the "unprotected users" group (such as via removal from a cached copy of the "unprotected users" group). Subsequently (and subject to other groups referenced by the permission lists) the particular user is conditional allowed to access the specific files and/or directories. When the agent is uninstalled (such as part of or in response to logging out), in response to (or alternatively as part of) the agent being uninstalled, the particular user is added (back; e.g. restored) to the "unprotected users" group (such as via ceasing to use or discarding the cached copy of the "unprotected users" group and/or by adding the particular user back to the cached copy of the "unprotected users" group). Subsequently the particular user is not allowed to access the specific files and/or directories. Between the time the agent is installed and the agent is uninstalled (e.g. a single log in session), the particular user is granted conditional access to the specific files and/or directories. The access is conditional because additional group information is consulted that conditionally results in denying access to one or more of the specific files and/or directories.

Agent

In some embodiments, the agent is a security agent. In some embodiments, the agent imposes usage restrictions, such as blocking of printing and/or of copying to a removable device. In embodiments where the agent dynamically and/or temporarily changes group membership of a user, or in other ways provides dynamic access rights to a user, a user without an installed agent is enabled to perform arbitrary operations to removable devices but is not enabled to access sensitive files, whereas a user with an installed agent is enabled to access sensitive files but is not enabled to perform arbitrary operations to removable devices.

Operation

Embodiments for Controlling Resource Access Privileges Via Agent Authentication

FIG. 1 illustrates selected details of an embodiment of a mechanism for controlling resource access privileges via agent authentication. Access to resources, such as files, are filtered somewhere between a requester and the resource. Client Computer 112, acting as a requester, makes File Requests 121 for a resource, such as for files stored on Networked Storage 114 (e.g. one or more SAN and/or NAS elements). Privilege Checking 123 conceptually represents various embodiments of filtering the requests, and only Allowed Requests 125 are forwarded to the resource. The resource returns File Data and/or Status 127 to the client computer in response to the allowed requests.

FIG. 2 illustrates selected details of an embodiment of the mechanism for controlling resource access privileges via agent authentication by authenticating access to resources using a resource firewall proxy server and out-of-band agent communication. Client Computer 112 makes File Requests 121 for a resource, such as for files stored on Networked Storage 114. The requests are sent over Network 291 to Resource Firewall Proxy Server 223 that determines if the requests are forwardable. The resource firewall proxy server filters the requests, and only Allowed Requests 125 are forwarded to the resource over Network 293. The resource returns File Data and/or Status 127 to the client computer in response to the allowed requests. In some embodiments, Resource Firewall Proxy Server 223 is installed in between a network segment containing the resource and a requester.

Continuing in FIG. 2, in response to installation of an agent on Client Computer 112, Out-of-Band Agent Communication 231 with Resource Firewall Proxy Server 223 authenticates the client computer and/or a user of the client computer. Prior to the authentication, Resource Firewall Proxy Server 223 filters requests from Client Computer 112. Subsequent to the authentication, at least some requests from Client Computer 112, such as requests from a particular user logged in when the agent was installed, are forwarded as all or any portion of Allowed Requests 125. Conceptually, various combinations of all or any portions of Network 291, Resource Firewall Proxy Server 223, and Out-of-Band Agent Communication 231 of FIG. 2 are examples of all or any portion of Privilege Checking 123 of FIG. 1. In various embodiments, the out-of-band communication originates with one or more of the agent and an installation program for the agent.

Figure 3:
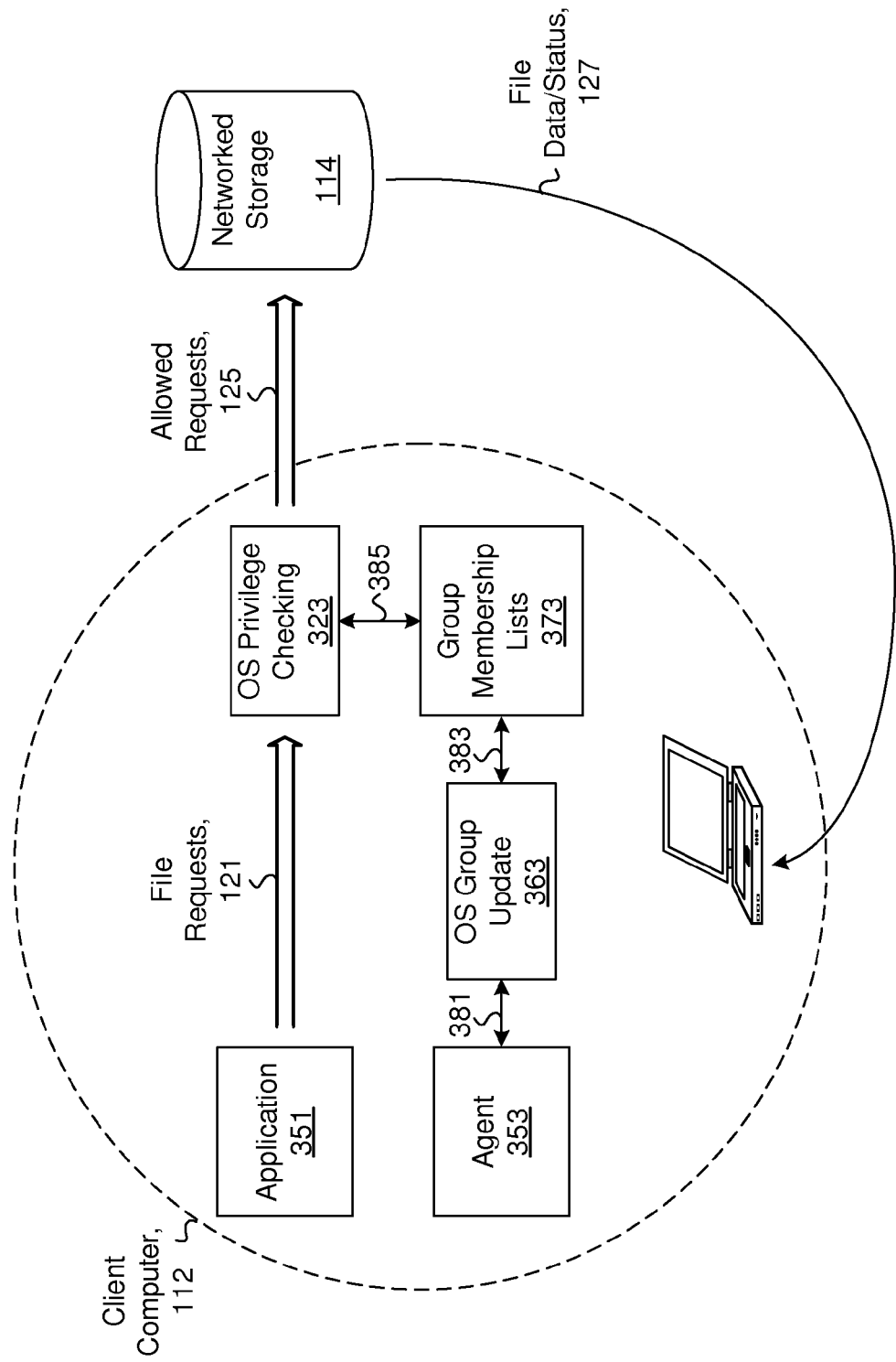
FIG. 3 illustrates selected details of an embodiment of the mechanism for controlling resource access privileges via agent authentication by authenticating access to resources using group membership lists and temporary updating of groups by an agent.

FIG. 3 illustrates selected details of an embodiment of the mechanism for controlling resource access privileges via agent authentication by authenticating access to resources using group membership lists and temporarily updating of groups by an agent. Client Computer 112 makes File Requests 121 for a resource, such as for files stored on Networked Storage 114. OS Privilege Checking 323 filters the requests, and only Allowed Requests 125 are forwarded to the resource. The resource returns File Data and/or Status 127 to the client computer in response to the allowed requests. In some embodiments, OS Privilege Checking 323 is a portion of an OS executing on Client Computer 112.

Continuing in FIG. 3, in response to installation of Agent 353 on Client Computer 112, the installation program and/or the agent communicates (conceptually indicated by coupling 381) with an OS Group Update function 363 of the OS to effect a temporary update (conceptually indicated by coupling 383) to Group Membership Lists 373 for a user of the client computer, such as a user logged in when the agent is installed. For example, OS Group Update function 363 provides a modified token to Group Membership Lists 373. The modified token is based on an original token corresponding to the logged in user (and group memberships associated therewith). The modified token is identical to the original token but with the logged in user removed from a group having relatively low privilege and/or permission to access resources, such as a group that is denied access to all resources. OS Privilege Checking 323 queries (conceptually indicated by coupling 385) the group membership lists to, at least in part, determine whether File Requests 121 from Application 351 are allowed. Conceptually various combinations of all or any portion of Agent 353, OS Group Update function 363, Group Membership Lists 373, OS Privilege Checking 323 and associated communications are examples of all or any portion of Privilege Checking 123 of FIG. 1.

Client Computer 112, according to various embodiments, includes one or more processors enabled to execute instructions from a computer readable storage medium. For example, the instructions include all or any portion of Application 351, Agent 353, OS Group Update function 363, Group Membership Lists 373 (or using/managing thereof), and OS Privilege Checking 323. Similarly, according to various embodiments, Privilege Checking 123 includes one or more processors enabled to execute instructions from a computer readable storage medium. For example, the instructions include all or any portion of functions suitable to filter requests.

Resource Access and Authentication

FIG. 4 illustrates selected details of an embodiment of accessing a resource, such as a file, including privilege checking of the accessing. Process 400 begins (Start 402) with a request being sent to a privilege checking module and/or routine (Send File Request to Privilege Checking 410). The request is examined to determine if it is allowable, e.g. does the requester have proper privilege to access the resource (Allow? 420), for example by checking a permission list for the file in relation to a user ID associated with the request. If the request is allowed (Yes 420Y), then it is forwarded to the resource (Forward Request to File System/Server 430), and in response the resource returns information, such as data and/or status (Return Data/Status to Requester 434). The requester then examines the status, to determine whether an error occurred (Status? 440). If an error occurred (Error 440E), then the error is logged and/or displayed, such as to a user (Report Error 483). Processing is then complete (End 499). If no error occurred (OK 440K), then processing is complete (End 499). If the request is not allowed (No 420N), then a message and/or error is logged and/or displayed, such as to the user (Report Error 481). Processing is then complete (End 499).

FIG. 5 illustrates selected details of an embodiment of a process for an agent to authenticate accesses to resources by updating a group membership list. Process 500 begins (Start 502) by initializing the agent (Agent Initialization 510). According to various embodiments, agent initialization occurs in response to one or more of installing the agent on a client computer, and executing the agent. The agent then optionally queries other entities (such as servers) to determine whether the instance/installation of the agent is valid (Valid? 520), e.g. legitimate and enabled to grant privilege and/or permission to access the resources. If so, (Yes 520Y), then the agent authenticates one or more of the client computer, a user logged into the client computer, and a user installing the agent (Agent Authentication—e.g., Temporarily Update Group Membership List 530). The authentication, for example, temporarily updates one or more group memberships, such as by removing the user from a temporary and/or cached copy of a "no access" group and/or adding the user to a temporary and/or cached copy of an "access allowed" group. For another example, the authentication temporarily changes access rights for the user and/or for the client computer. Then additional processing (if any) is performed by the agent (Other Agent Processing 540). Processing is then complete (End 599). If the agent instance/installation is not valid (No 520N), then an error is logged and/or displayed, such as to a user (Report Error 524). Processing is then complete (End 599).

In various embodiments, when the agent is one or more of: never installed, uninstalled, not executing, or determined to be no longer legitimate or no longer enabled to grant privilege and/or permission to access the resources, any entity previously authenticated by the agent is unauthenticated; e.g. previously granted permissions are revoked. For example, temporary updates to one or more group memberships, such as a temporary update that removes the entity from a "no access" group, are undone during an uninstall of the agent (e.g. the temporary removal is "forgotten"). For another example, updates to one or more group memberships, such as by adding the entity to a "no access" group, are performed during an uninstall of the agent. In the aforementioned examples where an entity is unauthenticated, the entity is one or more of: a user who is logged into the client computer, the user who installed the agent, or the client computer. In the aforementioned examples where an entity is unauthenticated, the "no access" group is a group that overrides all "access allowed" groups.

Agent-Based Authentication Via Group Membership Lists

FIG. 6A illustrates selected details of an embodiment of a process for managing a group membership list. Process 600 begins (Start 602) with all users (or a selected community of users) in a group having relatively low privilege and/or permission to access resources (All Users in Group "unprotected users" 610). Processing proceeds to wait for an update (such as a modification via an addition or deletion of a user) to the group (Group Update? 620), looping back if there is no update (No 620N). If there is an update to the group (Yes 620Y), then the update is examined to determine if it is an agent-based temporary update or an administrative update (Agent/Admin 630). If the update is a temporary update via an agent (Agent 630G), then a user is temporarily deleted from the group having relatively low privilege and/or permission (Temporarily Remove User From Group "unprotected users" 632). The temporary update is performed, for example, by removing an entry from a temporary or cached copy of a group membership list, overriding information in the temporary or cached copy that was obtained when a user was first authenticated (such as when the user logged in). The temporary or cached copy is subsequently used to perform permission checking, such as accesses to resources, e.g. files. Processing then flows back to await another update (Group Update? 620). If the update is an administrative update (Admin 630D), then a user is added to or deleted from a group, such as the group having relatively low privilege and/or permission (Admin Update to Group "unprotected users" 636). For example, an administrative update is used to add a new user (e.g., a new employee) to the group. Subsequently, when the new user is first authenticated (such as by logging in), the user is determined to be a member of the (relatively low privilege and/or permission) group. If an agent is installed, then the user is subsequently temporarily removed from the group, as described with respect to Temporarily Remove User From Group "unprotected users" 632. Processing then flows back to await another update (Group Update? 620).

FIG. 6B illustrates selected details of an embodiment of a process for agent-based authentication of access to a resource. Process 650 begins (Start 652) with a user attempting to access a resource via a request (User Request for Resource 660). A check then determines if an agent is operational and/or enabled, e.g. installed or executing (Agent Installed? 670). Based on whether an agent is installed, the request is allowed or denied. More specifically, if an agent is installed (Yes 670Y), then the user has been removed (albeit temporarily) from a group having relatively low privilege and/or permissions for resource access, and access to the resource is permitted (Request Allowed—User Not In Group "unprotected users" 672). Processing is then complete (End 699). If an agent is not installed (No 670N), then the user is still a member of the group having relatively low privilege and/or permissions for resource access, and access to the resource is not permitted (Request Denied—User In Group "unprotected users" 676). Processing is then complete (End 699).

Figure 7B:
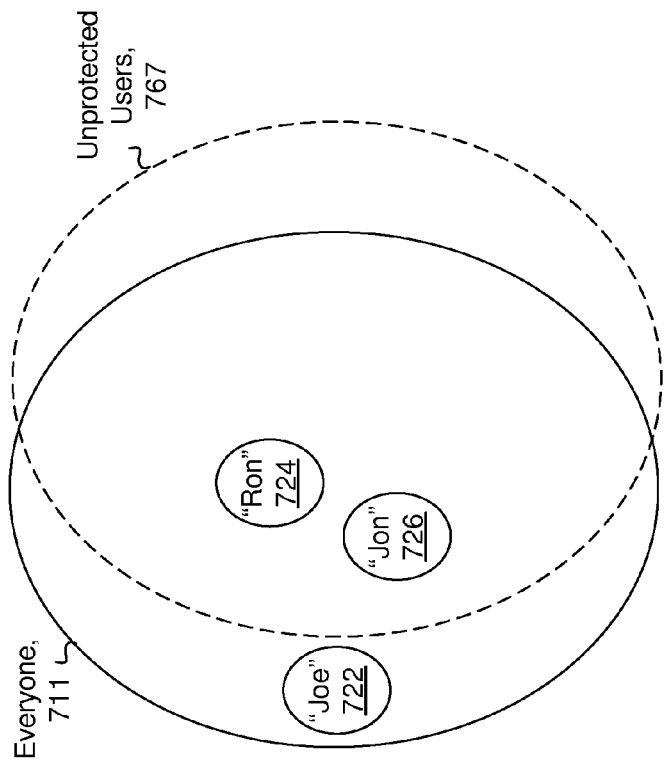
FIGS. 7A and 7B illustrate an example of group membership changing in response to authentication by an agent.
Figure 7A:
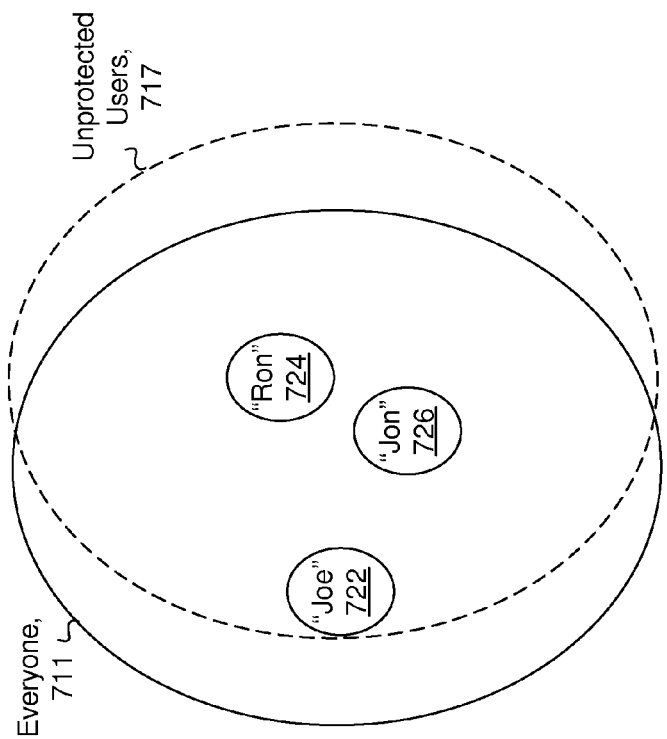

FIGS. 7A and 7B illustrate an example of group membership (temporarily) changing in response to authentication by an agent. In FIG. 7A, an initial condition is shown with a group of all users (Everyone 711) having members identical to a group with relatively low privilege and/or permissions (Unprotected Users 717). Both groups contain all users: user "Joe" 722, user "Ron" 724, and user "Jon" 726.

In some embodiments, FIG. 7B is a result of user "Joe" installing an agent on a client computer of user "Joe". Group membership has (temporarily) changed in FIG. 7B so that, while all users are still members of the group of all users (Everyone 711), user "Joe" 722 is no longer a member of the group with relatively low privilege and/or permissions (Unprotected Users 767), though both user "Ron" 724 and user "Jon" 726 are still members of the relatively low privilege and/or permission group (Unprotected Users 767). Thereafter, user "Joe" 722 is enabled to access resources that are denied to user "Ron" 724 and user "Jon" 726. For example, requests from user "Joe" 722 are passed to a particular resource, while requests from user "Ron" 724 and user "Jon" 726 are not passed to the particular resource (e.g. the requests are blocked). In some embodiments, Unprotected Users 717 is a group that is associated with or maintained in conjunction with a file system, such as a set of files residing on a storage server. An access to any of the set of files consults a cached copy of various groups, such as a cached copy of Unprotected Users 717, to determine if the access is allowed. Unprotected Users 767 corresponds to the cached copy after an installation of an agent for enabling control of resource access privileges via agent authentication, where a user has been temporarily deleted from the cached copy, thereby enabling access.

Example Implementation Techniques

In some embodiments, various combinations of all or portions of functions performed by a privilege checking unit (such as Privilege Checking 123 of FIG. 1), a resource firewall proxy server (such as Resource Firewall Proxy Server 223 of FIG. 2), an agent (such as Agent 353 in FIG. 3), and portions of a processor, microprocessor, system-on-a-chip, application-specific-integrated-circuit, hardware accelerator, or other circuitry providing all or portions of the aforementioned functions, are specified by descriptions compatible with processing by a computer system. The specification is in accordance with various descriptions, such as hardware description languages, circuit descriptions, netlist descriptions, mask descriptions, or layout descriptions. Example descriptions include: Verilog, VHDL, SPICE, SPICE variants such as PSpice, IBIS, LEF, DEF, GDS-II, OASIS, or other descriptions. In various embodiments the processing includes any combination of interpretation, compilation, simulation, and synthesis to produce, to verify, or to specify logic and/or circuitry suitable for inclusion on one or more integrated circuits. Each integrated circuit, according to various embodiments, is designed and/or manufactured according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

In some embodiments, various combinations of all or portions of functions as described by Application 351, Agent 353, OS Group Update function 363, Group Membership Lists 373 (or using/managing thereof), and OS Privilege Checking 323 of FIG. 3, all or any portion of processing as illustrated by one or more of FIG. 4, FIG. 5, FIG. 6A, FIG. 6B, and FIG. 7, are performed by execution and/or interpretation of one or more program instructions, by interpretation and/or compiling of one or more source and/or script language statements, or by execution of binary instructions produced by compiling, translating, and/or interpreting information expressed in programming and/or scripting language statements. The statements are compatible with any standard programming or scripting language (such as C, C++, Fortran, Pascal, Ada, Java, VBscript, and Shell). One or more of the program instructions, the language statements, or the binary instructions, are optionally stored on one or more computer readable storage medium elements.

CONCLUSION

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (i.e., the callouts or numerical designators) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as structure of group membership lists; structure of access rights and/or permission lists; types of access rights and/or permissions; a nature and/or a type of communications between software programs and/or modules; a nature and/or a type of communication between computers and/or resources; a nature and/or a type of a network; a nature and/or a type of resource; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, functions, operations, routines, and sub-routines. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A method comprising:
   initializing a group with respective entries corresponding to respective users that have controlled access to a resource;
   subsequently to the initializing, and in response to installing an agent program on a client computer having an association with at least one of the users, deleting at least one entry from a cached copy of the group, the deleted entry corresponding to the at least one user;
   subsequently to the installing, and in response to uninstalling the agent program from the client computer, adding an entry to the cached copy, the added entry corresponding to the at least one user;
   subsequently to the initializing, and in response to a request from the at least one user to access the resource, consulting the cached copy to determine if there is an entry corresponding to a source of the request, and if so, then denying the request; and
   wherein after the initializing, the at least one user is denied access to the resource unless the agent program is installed on the client computer associated with the at least one user.

2. The method of claim 1, wherein the group is a first group that is denied access to the resource and further comprising consulting a cached copy of a second group that is allowed access to the resource to selectively allow the request if there is not an entry in the first group corresponding to the source.

3. The method of claim 1, wherein the request comprises information identifying the source.

4. The method of claim 3, wherein the association comprises the client computer being the at least one user.

5. The method of claim 4, wherein the information comprises a network address.

6. The method of claim 3, wherein the association comprises the installing being performed by the at least one user.

7. The method of claim 6, wherein the information comprises a user identification.

8. The method of claim 1, wherein the association comprises the at least one user being logged into the client computer during at least a portion of the installing.

9. The method of claim 8, wherein the information comprises a user identification.

10. The method of claim 1, further comprising:
    determining if the source is associated with the client computer, and if so, then consulting a cached copy of another group that is allowed access to the resource to selectively allow the request; and
    determining if the source is associated with another client computer that is executing an instance of the agent program, and if so, then consulting the cached copy of the other group to selectively allow the request.

11. The method of claim 1, wherein the deleting comprises authenticating the installing, and leaving the at least one entry in the cached copy if the authenticating fails.

12. A system comprising:
    a processor enabled to communicate via a network interface; and
    a memory, the memory enabled to store instructions that when executed by the processor cause the processor to perform functions comprising:
      (a) initializing a first group with respective entries corresponding to respective client computers having controlled access to a resource, the first group being denied access to the resource;
      (b) subsequently to the initializing, and in response to installing an agent program on a particular one of the client computers, deleting an entry corresponding to the particular client computer from a cached copy of the first group;

(c) subsequently to the installing, and in response to uninstalling the agent program from the particular client computer, adding an entry to the cached copy of the first group, the added entry corresponding to the particular client computer;

(d) subsequently to the initializing, and in response to a request from the particular client computer received via the network interface, the request being to access the resource, consulting the cached copy of the first group to determine if there is an entry corresponding to the particular client computer, and if so, then denying the request;

(e) consulting a cached copy of a second group to selectively allow the request if there is not an entry in the cached copy of the first group corresponding to the particular client computer, the second group being allowed access to the resource; and wherein after the initializing, the particular client computer is denied access to the resource unless the agent program is installed on the particular client computer.

13. The system of claim 12, wherein the functions further comprise: (f) in response to the installing, adding an entry to the cached copy of the second group, the entry added to the cached copy of the second group comprising information based at least in part on information from the entry of the first group corresponding to the particular client computer.

14. The system of claim 13, wherein the information of the entry added to the cached copy of the second group comprises a network address of the particular client computer.

15. A non-transitory computer readable medium having a set of instructions stored therein that when executed by a processing element causes the processing element to perform functions comprising:

initializing a first group with respective entries corresponding to respective users having controlled access to a resource, the first group being denied access to the resource;

subsequently to the initializing, and in response to installing an agent program on a client computer having an association with at least one of the users, deleting at least one entry from a cached copy of the first group, the deleted entry corresponding to the at least one user;

subsequently to the installing, and in response to uninstalling the agent program from the client computer, adding an entry to the cached copy of the first group, the added entry corresponding to the at least one user;

subsequently to the initializing, and in response to a request from the at least one user to access the resource, consulting the cached copy of the first group to determine if there is an entry corresponding to the at least one, and if so, then denying the request;

consulting a cached copy of a second group to selectively allow the request if there is not an entry in the cached copy of the first group corresponding to the at least one user, the second group being allowed access to the resource; and wherein after the initializing, the at least one user is denied access to the resource unless the agent program is installed on the client computer associated with the at least one user.

16. The non-transitory computer readable medium of claim 15, wherein the functions further comprise: adding an entry to the cached copy of the second group in response to the installing, the entry added to the cached copy of the second group comprising information based at least in part on information from the deleted entry.

17. The non-transitory computer readable medium of claim 15, wherein the request comprises information identifying one of the users.

18. The non-transitory computer readable medium of claim 15, wherein the added entry comprises information identifying the at least one user.

19. The non-transitory computer readable medium of claim 15, wherein the installing is performed by the at least one user.

20. The non-transitory computer readable medium of claim 15, wherein the installing is performed at least partially while the at least one user is logged into the client computer.

* * * * *